(12) United States Patent
Alzner

(10) Patent No.: US 7,477,434 B2
(45) Date of Patent: Jan. 13, 2009

(54) PROCESS AND APPARATUS FOR RETRIEVING INFORMATION PROJECTED IMAGE-WISE ON A PHOTO-STIMULABLE PHOSPHOR IMAGING SUBSTRATE UTILIZING A NON-ORTHOGONAL PENTAPRISM

(75) Inventor: Edgar Alzner, Garden City, NY (US)

(73) Assignee: Air Techniques, Inc., Melville, NY (US)

( * ) Notice: Subject to any disclaimer, the term of this patent is extended or adjusted under 35 U.S.C. 154(b) by 90 days.

(21) Appl. No.: 11/436,481

(22) Filed: May 18, 2006

(65) Prior Publication Data

US 2006/0262370 A1    Nov. 23, 2006

Related U.S. Application Data

(60) Provisional application No. 60/683,427, filed on May 23, 2005.

(51) Int. Cl.
*G02B 26/08*    (2006.01)

(52) U.S. Cl. ...................................... 359/196; 359/833
(58) Field of Classification Search ................ 359/196, 359/197
See application file for complete search history.

(56) References Cited

U.S. PATENT DOCUMENTS 5,594,514 A * 1/1997 Klees ........................ 396/429
5,844,679 A * 12/1998 Detweiler et al. ........... 356/248

* cited by examiner

*Primary Examiner*—Euncha P Cherry
(74) *Attorney, Agent, or Firm*—Clifford G. Frayne; Louis E. Marn

(57) ABSTRACT

There is disclosed a process and apparatus for interrogating or scanning an imaged storage substrate wherein a laser beam is directed towards the imaged storage substrate in a plane disposed at a non-orthogonal angle to such storage substrate thereby to stimulate luminescent information for detection by a linear sensor.

7 Claims, 1 Drawing Sheet

PROCESS AND APPARATUS FOR RETRIEVING INFORMATION PROJECTED IMAGE-WISE ON A PHOTO-STIMULABLE PHOSPHOR IMAGING SUBSTRATE UTILIZING A NON-ORTHOGONAL PENTAPRISM

RELATED APPLICATION

Applicant claims the benefit of provisional application 60/683,427, filed May 23, 2005.

BACKGROUND OF THE INVENTION

1. Field of the Invention

This invention relates to radiographic imaging, and more particularly to an improved process and apparatus for stimulating information stored on a photo-stimulable phosphor imaging substrate utilizing a non-orthogonal pentaprism.

2. Description of the Prior Art

Traditional x-ray imaging systems using silver-based films are being replaced by radiographic imaging systems using photo-stimulable phosphor imaging substrates or films eliminating the need for physical storage of the resulting imaged film since digital retrieval of the image information includes input and computer storage permitting viewing of such information on a viewer, such as CRT tube assembly. Additionally, such computer stored image information permits facile electronic transmission to any preselect location obviating physical transfer of the thus formed image as developed on the imaging film.

In U.S. Pat. No. 5,874,744 to Goodman, et al., assigned to the same assignee as the present invention herein incorporated by reference, there is disclosed a process and apparatus for processing radiographic information from an anisotropic storage phosphor screen including an opto-electro-mechanical assembly to achieve raster scan of an interrogating beam and including detector and computer assembly.

In U.S. Pat. No. 6,599,004 to Thoms incorporated by reference, there is disclosed a device for reading flexible storage films wherein the flexible storage film having image-wise projected information is positioned on a cylindrically-shaped surface and is caused to be linearly moved there over while being interrogated or scanned via a slot by a light beam generated in a helical line in a continuous manner from a point disposed at the axis of the cylindrically-shaped surface.

In copending application Ser. No. 60/725,984, assigned to the same assignee as the present invention, hereby incorporated by reference, there is disclosed a process and apparatus for interrogating or scanning a photo-stimulable phosphor substrate containing projected image-wise information wherein a laser beam is directed towards a lens to produce a planar light beam directed onto the storage substrate as a focused light line to stimulate luminescent information detected by a linear sensor for collection and transmission to a computer assembly.

If the output signal of the photomultiplier is recorded together with the output signals of the position encoders one obtains an electric image of the x-ray image previously formed in the storage film in the form of exited metastable color centers of the phosphor particles. This image is then further processed electrically in view of changing the scale of reproduction, emphasizing details, improving the signal/noise ratio, etc. The resulting x-ray image may be put into an archive in its original and/or digitally processed form requiring only little space.

The light source or laser beam utilized for the interrogation of the storage film is generated and directed into an orthogonal pentaprism. In the orthogonal pentaprism, the light source or laser beam enters an inlet facet and undergoes two reflections within the pentaprism exiting the outlet facet 90 degrees disposed to the inlet facet and thence to the surface of the storage film. The light source or laser beam is coupled with a sensor diode so as to maintain the light source or laser beam at an appropriate intensity to excite and therefore interrogate and read the surface of the storage film.

The excitation of the surface of the storage film by a laser beam or light source through an orthogonal pentaprism perpendicular to the surface of the storage film often results in a reflection of luminescent light traveling in the reverse direction of the laser or light source and this reflected light being sensed by the sensor diode coupled to the laser or light source causes the level of the light source or laser to vary in intensity, thus contributing to interference-like phenomena which causes the image on the storage film which is being interrogated, captured by the detection unit and photomultiplier and stored to be less than the desirable clarity as a result of the fluctuation in light source or laser intensity. Such reflected light may also be re-reflected onto the storage film thereby resulting in small amounts of additional excitation from the storage film area illuminated by said re-reflected laser light and may therefore be detected by the detecting unit further decreasing the clarity of the image read and stored.

As used herein, the term "storage substrate" is a film plate or sheet including a photo-stimulable phosphor layer is capable of being imaged with ionizing radiation or x-rays which after imaging may be interrogated or scanned with a source of light energy to produce photostimulated luminescence information capable of being digit recovered and stored.

OBJECTS OF THE INVENTION

An object of the present invention is to provide an improved process and apparatus for interrogating or scanning a storage substrate to provide a scanned image of greater clarity Another object of the present invention is to provide an improved process and apparatus for interrogating or scanning a storage substrate to provide a scanned image of improved resolution.

Yet another object of the present invention is to provide an improved process and apparatus for interrogating or scanning a storage substrate substantially eliminating the effects of reflected/re-reflected light.

SUMMARY OF THE INVENTION

These and other objects of the present invention are achieved by a process and apparatus for interrogating or scanning a storage substrate containing projected image-wise information wherein a laser beam is directed towards the storage substrate in a plane disposed at a non-orthogonal angle to such storage substrate thereby to stimulate luminescent information for detection by a linear sensor

BRIEF DESCRIPTION OF THE DRAWINGS

Further objects and advantages of the present invention will become more readily apparent by reference to the following detailed description thereof when taken with the accompanying drawings wherein like numerals designate like parts throughout and wherein.

DETAILED DESCRIPTION OF THE PRESENT INVENTION

Figure 1:
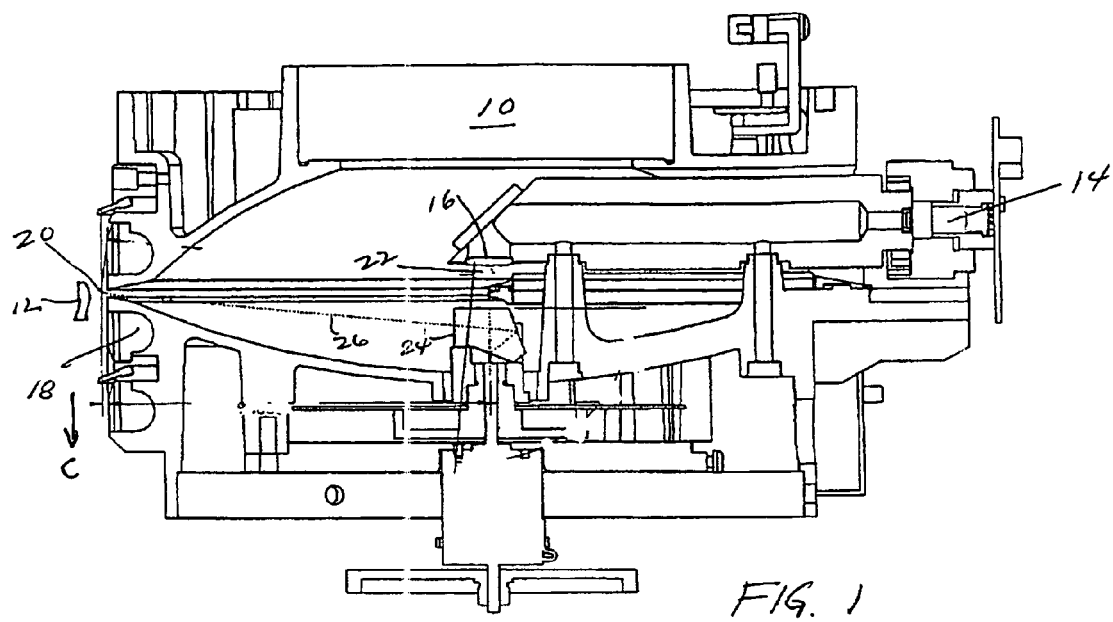
FIG. 1 is a cross-sectional view of the scanning portion of a process and apparatus for retrieving information from a storage film illustrating the process and apparatus of the present invention.

Referring now to the drawing, and particularly FIG. 1, there is illustrated a scanner assembly portion commonly referred to as the optical cavity, generally indicated as 10, for an assembly for retrieving information projected on a storage substrate 12, and is comprised of a source of laser light 14, a cylindrical lens 16, a linear light detector 18 and a horizontal and a transport assembly (not shown), for the storage substrate 12 having a projected image formed thereon and traversing a slot 20.

It is understood to one skilled in the art that the elements are positioned within a suitable housing assembly (not shown) having a slot for inserting the storage substrate and an appropriate exit slot for withdrawing the scanned storage substrate. The transport assembly may include roller and belt assemblies, such as disclosed in the aforementioned U.S. Patent to Thoms, however configured in vertical array.

Figure 2:
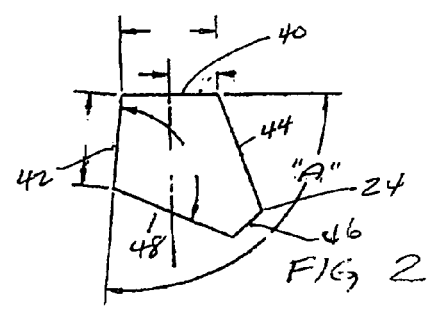
FIG. 2 is an elevational view of a non-orthogonal pentaprism for reflecting a laser beam.
Figure 3:
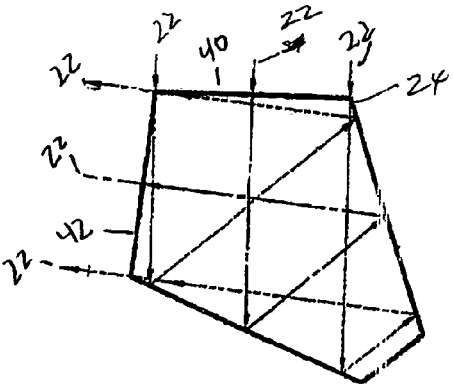
FIG. 3 is enlarged view of the non-orthogonal pentaprism of FIG. 2 illustrating path of reflected light.

The laser light source 12 is disposed to direct a laser beam to the cylindrical lens 16 dimensioned to produce a light beam 22 (indicated by the doted line) for projection via a rotating non-orthogonal pentaprism 24 as a focused light line 26 at a non-orthogonal angle, i.e. an angle greater or less than 90° to the storage substrate 12 being moved on the transport assembly 16. Intensity energy level of the laser beam is adequate to produce a light beam, after passage through the lens 16 at an intensity level sufficient to stimulate light energy stored on the storage substrate 12. Photo-stimulated luminescent light generated at the contact point is detected by the light detector 18, for example CCD elements, and processed, such as disclosed in the aforementioned U.S. Patent to Goodman, et al. It will be understood that positioning of the light detector 18 in the housing is for most efficacious detections and collection of the stimulated luminescent light, as understood by one skilled in the art The non-orthogonal pentaprism 24, referring now to FIG. 2 is formed by an inlet facet 40, and outlet facet 42 and cooperating facets 44, 46 and 48 wherein facets 44 and 48 are provided with reflective surfaces as understood by one skilled in the art. A plane of the inlet facet 40 is formed an angle "A" with a plane of the outlet facet 42 of greater than 90° thereby to reflect the laser beam 22 focussed on the inlet facet 40 within the non-orthogonal pentaprism to exit the outlet facet 42 at an acute angle with respect to the plane of the inlet facet 40 and is directed upwardly (See FIG. 4) towards the photo-stimulable phosphor substrate 12 at a non-orthogonal angle thereby to eliminate or substantially reduce reflection of stimulated light via the outlet facet 42 which would effect scanning efficacy. FIG. 3 illustrates the reflection of light within the non-orthogonal pentaprism 24.

Figure 4:
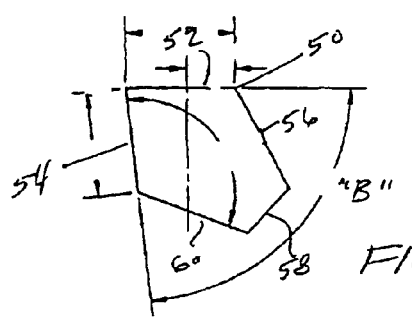
FIG. 4 is an elevational view of another non-orthogonal pentaprism for reflecting a laser beam.
Figure 5:
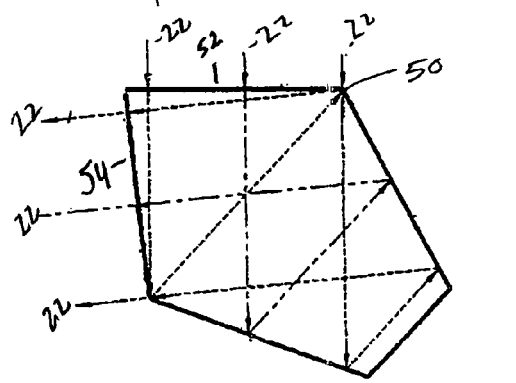
FIG. 5 is an enlarged view of the non-orthogonal pentaprism of FIG. 4 illustrating path of reflected light.

Referring now to FIG. 4, there is illustrated a non-orthoganal pentaprism 50 having an inlet facet 52, and outlet facet 54 and cooperating facets 56, 58 and 60 wherein facets 56 and 60 are provided with reflecting surfaces wherein a plane of the inlet facet 52 is formed at an angle "B" with a plane of the outlet facet 54 less than 90° thereby to reflect laser beam focused on the inlet facet 52 within the non-orthogonal pentaprism 50 to exit the outlet facet 54 at an acute angle with respect to the plane of the inlet facet 52 which is then directed downwardly (See FIG. 5) to a photo-stimulable phosphor substrate. FIG. 5 illustrates the reflection of light within the non-orthogonal pentaprism 50.

It will be understood by one skilled in the art that the positioning of the non-orthogonal pentaprism 50 of FIG. 4 within the assembly is different than the positioning of the non-orthogonal pentaprism 24, i.e. a plane of the inlet facet 52 would be above the plane of the slot 20.

In operation, a storage substrate 12 having a projected image thereon for scanning is positioned proximate the entry slot as hereinabove discussed and sensed to cause the transport assemblies to move the substrate vertically into the housing assembly. The storage substrate is moved in a direction indicated by the arrows "C" in essentially perpendicular relationship to the light beam 22 to effect photo-stimulable luminescence, as herein above discussed, which is sensed by the light detector 18.

While the present invention has been described with respect to exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

What is claimed is:

1. In a process for scanning an imaged storage substrate with a laser beam from a light source capable of producing photo-stimulable luminescent light from stored energy of the image which is detected, collected and stored in a computer assembly and wherein a transport assembly causes said imaged storage substrate to be passed over a cylindrically-formed slot, the improvement which comprises:

directing said laser beam from said light source through said slot in a non-orthogonal angle to said imaged storage substrate.

2. The process for scanning an imaged storage substrate as defined in claim 1 wherein said laser beam is reflected within a non-orthogonal pentaprism.

3. The process for scanning an imaged storage substrate as defined in claim 2 wherein said non-orthogonal pentaprism is position to direct said laser light upwardly towards said imaged substrate 4. In an apparatus for scanning an imaged storage substrate with a laser beam from a light source capable of stimulating photo-stimulable luminescent light from stored energy of projected image-wise information which is detected, collected and stored on a computer assembly and wherein a transport assembly moves said imaged storage substrate passed a cylindrically-shape slot, the improvement which comprises:

means for reflecting said laser beam from said light source in an non-orthogonal angle through said slot onto said imaged storage substrate.

5. The apparatus for scanning an imaged storage substrate as defined in claim 4 wherein said means for reflecting said laser beam is a non-orthogonal pentaprism.

6. The apparatus for scanning an imaged storage substrate as defined in claim 5 wherein said non-orthogonal pentaprism is comprised of an inlet facet and an outlet facet wherein an angle between a plane of said inlet facet with a plane of said outlet facet is less than 90°.

7. The apparatus for scanning an imaged storage substrate as defined in claim 5 wherein said non-orthogonal pentaprism is comprised of an inlet facet and an outlet facet wherein an angle between a plane of said inlet facet with a plane of said outlet facet is greater than 90°.

* * * * *